United States Patent [19]
Zelson

[11] 3,827,292
[45] Aug. 6, 1974

[54] OPTICAL AID FOR SIMULATED DRIVING OF MOTOR VEHICLES
[75] Inventor: Joseph Zelson, Claymont, Del.
[73] Assignee: E. I. du Pont de Nemours & Company, Wilmington, Del.
[22] Filed: June 6, 1972
[21] Appl. No.: 260,246

[52] U.S. Cl. .................................................. 73/117
[51] Int. Cl. ......................................... G01m 15/00
[58] Field of Search......... 73/117, 123; 35/11, 12 L, 35/12 N; 116/135, 29; 33/1 C

[56] References Cited
UNITED STATES PATENTS
2,627,674   2/1953   Wilson .................................. 35/11
3,606,328   9/1971   Delphia ............................... 73/117

OTHER PUBLICATIONS
Pohl Associates, Inc., Throttle Monitor, Two Pages, 1959–1961 (page 1), 1969 (page 2).

Primary Examiner—James J. Gill
Assistant Examiner—Anthony V. Ciarlante

[57] ABSTRACT

Method and optical driver aid for following a prescribed simulated motor vehicle driving schedule, for example, such as used in automobile exhaust emission control tests, wherein a moving driving cycle trace is projected onto a viewing screen and followed by an indicator means which is responsive to the motor vehicle speed and operation.

2 Claims, 3 Drawing Figures

PATENTED AUG 6 1974  3,827,292

OPTICAL AID FOR SIMULATED DRIVING OF MOTOR VEHICLES

BACKGROUND OF THE INVENTION

1. Field of the Invention

This invention relates to a method and an apparatus for following a prescribed driving schedule employing a motor vehicle mounted on a dynamometer. More particularly, it relates to carrying out a simulated driving schedule with the assistance of an optical driver aid wherein a moving image of a driving schedule trace is projected onto a viewing screen and followed by an indicator means which is responsive to the vehicle speed and operation.

2. Description of the Prior Art

The release of pollutants from motor vehicle exhausts, in terms of effect on the ecology of the atmosphere, has been a subject of worldwide governmental concern. In the United States, for example, Title 45, Code of Federal Regulations, "Public Welfare," Chapter XII, Part 1201 and 36 Federal Register 12652–12663, July 2, 1971 provide standards and test procedures for exhaust emissions for motor vehicles to be produced in the near future. In checking conformance to these standards, the emission levels are to be determined while the motor vehicle is simulating an average trip of 7.5 miles from a cold engine start in an urban area. The simulated trip consists of engine startup and vehicle operation on a chassis dynamometer following a prescribed driving schedule. During operation a proportional part of the diluted exhaust emission is collected continuously and analyzed to determine the emission levels of hydrocarbons, carbon monoxide and oxides of nitrogen. The driving schedule specifies a series of non-repetitive cycles of idle, acceleration, cruise and deceleration over a test period of 1,372 seconds, with the vehicle speed being specified for each second of the test period. Since the specified driving schedule is exacting and non-repetitive, with varying cruising speeds and rates of acceleration and deceleration, considerable difficulty is experienced in following the driving schedule accurately.

Several devices are available in the art to facilitate following such driving schedules. One device is essentially a galvanometer mounted in a small case with a paper loop containing the speed program drawn on it. The galvanometer needle deflects in response to the electrical output from a generator which is connected to the dynamometer roller and which produces a signal proportional to the vehicle speed. In operation, the driver of the motor vehicle maintains the galvanometer needle tip on the moving line of the speed program by accelerating, decelerating and braking where required. Although such a device may be compact in size and relatively inexpensive, difficulties may be encountered in its operation. For example, as the galvanometer needle sweeps across the face of the chart, the tip of the needle describes an arc with the point of the needle attachment as the focus. Hence, if one tries to maintain the vehicle speed by keeping the tip of the needle on a linear plot of the speed program on the paper loop moving at a constant rate, the prescribed speed-time relationship of the program will not be accurately followed since the places of intersection of the needle tip and the line drawing relative to the moving chart will vary. For example, when the horizontal position of the galvanometer needle indicates idle (0 m.p.h.) and the vertical position indicates 60 m.p.h., in going from idle to 60 m.p.h. the position of intersection of the needle tip with the speed program will change from a plane described by the needle in a horizontal position to a plane which is removed by a distance equivalent to the length of the needle. In other words, an error in the time schedule between 0 and 60 m.p.h. will be equivalent to the time required for the paper loop to traverse the distance equivalent to the length of the needle. This difficulty can be avoided by plotting, non-linearly, the vehicle speed and time to compensate for the non-linear sweep of the galvanometer needle across the chart. Such a plot is difficult to make, however. Other possible disadvantages of the abovedescribed device may include (1) a parallax error in relating the needle tip to the speed program line; (2) a difficulty in following a non-linear plot of speed and time; (3) dimensional changes in the paper loop due to the weather; and (4) timing errors caused by the wearing and tearing of the sprocket holes.

Another device that is available for following a prescribed driving schedule is a fully automatic system which does not require a driver. In this device the speed program is drawn on a metallized chart paper with a stylus which removes a fine line of conductive coating. The chart thus is divided into two conductive areas separated by the non-conductive program line inscribed by the stylus. In operation the two conductive areas are separately energized to establish a voltage gradient across the program line. A probe driven by a servo system is maintained on the program line. The probe is connected to an output potentiometer and a signal is generated which is proportional to the program curve. This signal is fed to a computer which compares this signal with a signal from the dynamometer generator. The difference in the signals is then relayed to an actuator which controls the accelerator and the brake pedals. Such a device is useful only with motor vehicles equipped with automatic transmissions, that is, it cannot be used on motor vehicles with manual transmissions which require gear shifting. Moreover, such a device is expensive in that it requires a computer to compare signals and an actuator to control accelerator and brake pedals. Finally, accurate preparation of a driving schedule on a conductive chart is difficult and costly.

In view of the increasing interest in monitoring motor vehicle exhaust emissions, a need exists for a device which is simple to use, provides for accurately following a prescribed driving schedule, is economical to construct and operate, is versatile in that it can be used with cars equipped with manual as well as automatic transmissions, and is readily adaptable to different driving schedules.

SUMMARY OF THE INVENTION

An object of the present invention is to provide a method and an apparatus to accurately follow a prescribed dynamometer driving schedule. A further object of the invention is to provide a driver aid device which is simple to use, compact, versatile and economical. It is a still further object to provide an apparatus which can readily provide for different driving schedules.

In summary the present invention resides in a method for accurately following a prescribed motor vehicle dynamometer driving schedule, which method comprises following by an indicator means a projection on a screen of a moving image of a plot of motor vehicle speed and time, said image moving at a constant speed and said indicator means being responsive to the speed of said motor vehicle and moving perpendicularly relative to the movement of said image.

DETAILED DESCRIPTION OF THE INVENTION

The present invention provides an accurate method for following a prescribed driving schedule which is used in the determination of air pollutants from motor vehicles and an apparatus which makes possible the accurate adherence by the motor vehicle driver to the prescribed driving schedule. Basically, the method involves observation by the driver of a moving image of the speed/time plot of the prescribed driving schedule projected on a screen and then maintaining a motor vehicle speed indicating means on the plot through appropriate use of the accelerator or brake.

One embodiment of the invention consists of 1. a projection means to project upon a viewing screen a moving image of a plot of the motor vehicle speed and time of a prescribed driving schedule, the image traversing the face of the screen at a constant and precise speed, and 2. an indicator means to follow the projected image, the indicator means being responsive to the motor vehicle speed which is being independently controlled and moving perpendicularly relative to the movement of the image.

A more specific embodiment of the invention consists of 1. a self-contained projection containing a viewing screen and an optical projection means comprising a lamp, a collimator lens system, a film gate, a diverging lens system and a pair of mirrors, the collimator lens system disposed between the lamp and the film gate for directing the light onto the film gate and the diverging lens system disposed between the film gate and the mirrors, the mirrors so arranged that the light emerging from the diverging lens system falls upon the first mirror and is reflected to the second mirror, the second mirror then reflecting the light to strike the viewing screen and thereby projecting an image on the viewing screen when a film is in position in the film gate, 2. a strip film advancing means to continuously move a film through the film gate at a constant and precise rate, the film having recorded thereon an image of a plot of motor vehicle speed and time of a prescribed driving schedule and being advanced through the film gate in a direction such that the projected image moves in a specified direction on the viewing screen, and 3. an indicator means positioned so that the indicator means covers a portion of the viewing screen and is responsively attached to a servo unit so that its movement is in a direction perpendicular to the direction of the movement of the projected image, the servo unit comprising a servo motor and a servo amplifier and being capable of receiving an electrical signal from a dynamometer generator, which signal is proportional to the motor vehicle speed which is being independently controlled.

Figure 1:
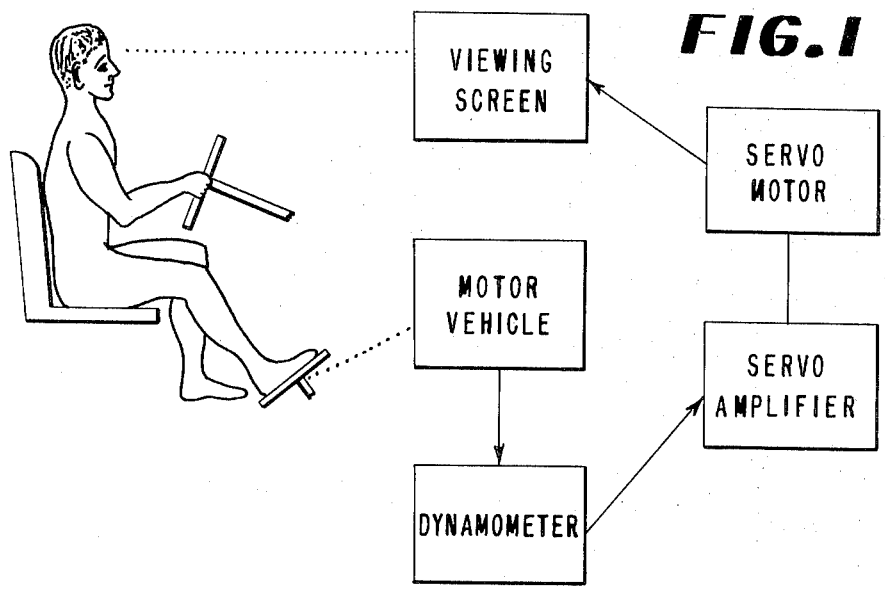
FIG. 1 is a schematic drawing of the basic components of the driver aid.
Figure 2:
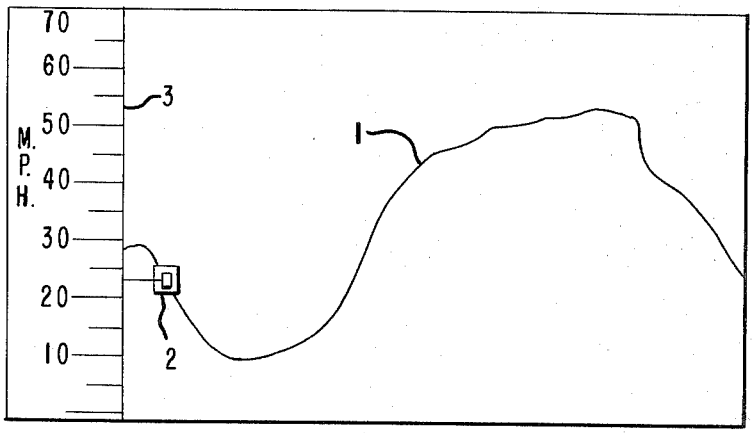
FIG. 2 is a schematic representation of one embodiment of the viewing screen.
Figure 3:
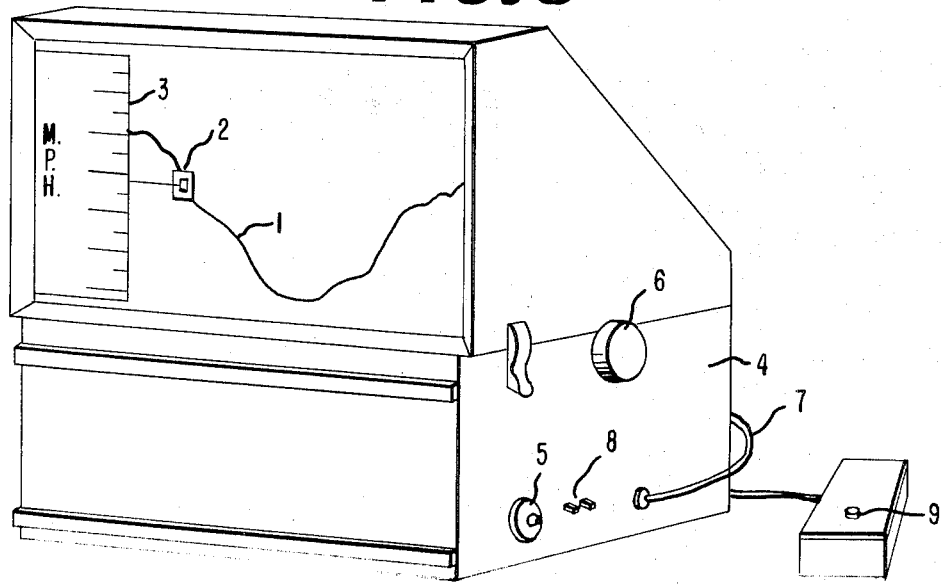
FIG. 3 represents a portable device containing the viewing screen of FIG. 2.

In FIG. 1 the motor vehicle driver observes a projection of a driving cycle trace on the viewing screen and the position of an indicator relative to the cycle trace (as shown in FIGS. 2 and 3). The driver responds to maintain the indicator on the cycles trace (by maintaining speed, by accelerating or by decelerating) by appropriate control of the accelerator and brake pedals. The vehicle speed is transmitted to the rollers of the dynamometer from which an electrical signal proportional to the motor vehicle speed is generated and sent to a servo amplifier. The electrical signal is then sent from the amplifier to a servo motor which provides appropriate movement of the indicator on the viewing screen.

In FIG. 2 the driving cycle trace 1 is projected onto the screen from the rear and moves from right to left at a constant and precise rate toward the indicator 2. The indicator 2 is responsive to the speed of the motor vehicle and is moved vertically by the servo motor. The projected image can also contain, at specified intervals, indications of the time remaining in the driving schedule. Scale 3 represents the motor vehicle speed.

FIG. 3 represents a portable device containing the viewing screen of FIG. 2. The dynamometer input (not shown) is located behind housing 4 and the servo system (not shown) is located within the housing 4. The span/zero adjustment knob 5 is used to adjust the indicator 2 position so that it gives the correct vehicle speed. Fast film rewind knob 6 is used to quickly position the trace at any desired position. Illustrative of the operation, the driver aid apparatus is placed in a convenient place, for example, on the hood of the motor vehicle immediately in front of the driver or in any other position such that the driver in a normal driving position can view the screen. The apparatus is connected to an electrical outlet using power cord 7 and the dynamometer speed input is connected to the unit. The zero point of the indicator 2 is set at 0 m.p.h. using the span/zero adjustment knob 5. The motor vehicle is then operated at a convenient speed and the span/zero adjustment knob 5 is used to adjust the indicator 2 to the correct speed. Generally, for any given dynamometer only one such adjustment is necessary. Subsequent tests with different motor vehicles can be carried out without any further adjustment of the indicator. The cooling fan and the projection lamp 8 are then turned on and the film is positioned at the starting point by using the rewind knob 6. To begin the driving schedule film drive motor 9 is switched on and the driver maintains cycle trace 1 within the rectangles of indicator 2. The indicator with the two rectangles as shown in FIGS. 2 and 3 is so constructed that if the portion of the cycle trace 1 is kept within the smaller rectangle, a tolerance of $\pm$ 1 m.p.h. and $\pm$ 0.5 second is maintained, whereas if the portion of the cycle trace is kept within the larger rectangle, a tolerance of $\pm$ 2 m.p.h. and $\pm$ 1.0 second is maintained.

Although any film projector can be used, conveniently, the projection systems are portable, commercially available, self-contained systems. Such units are sold for advertising display purposes and have viewing screens which have areas of about 100 square inches and overall dimensions of about 15 inches × 15 inches × 12 inches. These portable projector units are so constructed that when the units are opened for use, the viewing screens are positioned vertically. The optical system typically comprises a projection lamp, with or without a lamp housing, a collimator lens system to pass light in parallel into a film gate, a diverging lens system to obtain enlarged images from the film, and a pair of mirrors so placed that the light from the diverging lens system is reflected from the first mirror to the second mirror and thence to the reverse side of the viewing screen. The projected image is typically enlarged 6 to 10 times and the film strip commonly used is a 35 mm. film.

In order for the driver to follow a prescribed driving schedule accurately by maintaining the motor vehicle speed indicator on the cycle trace projected on the viewing screen, the projected image must move across the viewing screen at a precise and a constant rate and it must be an accurate plot of the motor vehicle speed and time of the prescribed driving schedule. The film drive means can be any system which can precisely advance the film continuously through the projector optical system. Film-advancing means typically comprise one or more drums with sprockets, one such drum being driven by a synchronous motor, either directly by the motor or through a gear arrangement. The particular rate of film advance through the optical system determines the length of the film required to cover the prescribed driving schedule. Thus, if a one-inch diameter film-advancing drum driven by the synchronous motor rotates at 24 revolutions per hour, the film will advance through the optical system at the rate of 1.26 inches minute or 0.021 inch per second. Assuming a driving schedule which requires 1,372 seconds, the film covering such driving schedule at the above-film-advancing rate should be 1,372 × 0.021, that is, 28.81 inches, long. For ease of handling of the film it is preferred that the film-advancing rate be in the range of about 0.9–1.3 inches per minute so that the total film length is about 20–30 inches long and the rate of travel of the projected image on the viewing screen is about 5–13 inches per minute.

Although various methods can be used to produce a film having an accurate reproduction of the driving cycle trace on the film, a procedure using the following steps in conveniently used:

1. An accurate plot of the vehicle speed and time of the driving schedule, with the vehicle speed as the ordinate and the time as the abscissa, is made on a chart which is from two to six times larger than the desired film size. Thus, if the desired film is a 35 mm. film of 30 inches in length, the plot is made on a chart which is 3–9 inches wide and 60–180 inches long. Such plotting can be done manually or with the aid of a computer.

2. The chart is then photographed with a special camera, such as an "Opti-Copy" camera-projector, a unit which combines the capabilities of a process camera and a precision projector. Such a unit can photograph a large chart as a single picture with very little distortion of the features.

3. The negative produced by the "Opti-Copy" camera is then projected precisely upon a copy board provided with a film strip of the desired size, careful attention being made in reducing the image size to produce a film strip of the exact desired length. Conveniently, the film strip is a 35 mm. film although 8 mm., 16 mm. and other sizes can be used. The film strip when developed will have the positive image of the plot of the motor vehicle speed and time. As already indicated, the image of the plot of vehicle speed and time on the film is that of a single picture (frame) in contrast to a motion picture type film wherein multiple frames comprise the film strip. Thus, in the projection of the driving schedule trace in the present apparatus, the image on the viewing screen is that of a segment of a single picture being projected in a continuously moving manner.

The use of a film strip and the projection thereof in the preferred form of the apparatus offers the following advantages:

1. the image of the driving schedule seen on the viewing screen by the driver is bright and clear and is easy to follow, even at a considerable distance;

2. films, particularly of "Mylar" polyester base, are strong and do not undergo appreciable dimensional changes with changes in temperature and humidity and the sprocket holes are less susceptible to deformation or tearing than those of paper loops;

3. the film can be readily produced in contrasting colors so that the projected image is easier to see and less fatiguing to the eyes;

4. the film can have other tracings thereon which, by use of a photocell, can be employed to automatically activate any other component desired; for example, a continuous straight tracing may be on the lower portion of the film, wherein the beginning of such tracing is coincidental with the start of the driving schedule and the end of the tracing is coincidental with the end of the driving schedule, so that the light which is transmitted through the tracing impinges on a photocell which can then activate a recorder to obtain a permanent record of the driver's performance, the signal to the recorder being conveniently taken off the same servo unit which controls the speed indicator.

The servo unit which receives the signal from the dynamometer roller generator and translates such signal into the movement of the speed indicator can be any one of a number that are available commercially. A servo unit, chosen to match the signal input of up to about 10 volts, is satisfactory. The speed indicator can be placed either in front of or behind the viewing screen. In either case, the indicator is placed as close to the screen as possible without contacting its surface. Preferably, the indicator is placed behind the screen so that a sharply defined shadow of the indicator is seen on the screen. In locating the indicator behind the screen, the problem of parallax is eliminated and the possibility of damage to the indicator is greatly reduced. The indicator ususally is located toward one edge of the viewing screen, preferably at the edge portion toward which the projected cycle trace image is moving. With the indicator located at such a position, the driver of the vehicle has the advantage of seeing the cycle trace proceeding toward the indicator and can thus anticipate the response that must be made to keep the indicator on the cycle trace. The indicator can be a needle but it is preferably a needle with an open rectangle or rectangles mounted on the tip. By constructing such open rectangles in proper dimensions relative to the projected image size, the driving cycle trace can be more accurately followed. The speed indicator can be responsively connected to the servo motor of the servo unit by cord and pulleys so that the indicator movement is in the direction perpendicular to the direction of the movement of the projected image. Generally, the movement of the projected image is in the horizontal direction and the indicator movement is vertical.

The present invention provides a driver aid apparatus with the following advantages:

1. low cost;
2. simplicity of use;
3. compact size and light weight such that the apparatus can be positioned in front of the driver, on the vehicle hood if desired, and the driver can view the apparatus from the normal driving position;
4. rapid film rewind system so that the driving schedule can be repositioned to the starting position in the event that restart of the test is necessary;
5. use of a film to carry the trace provides for a bright image of the projected driving cycle on the screen;
6. more accurate following of the prescribed driving schedule is possible due to elimination of parallax between the indicator and the cycle trace, particularly when the indicator is placed behind the viewing screen, anticipation by the driver of the required response from his observation of the cycle trace approaching the indicator, and close adherence to the driving schedule tolerance by maintaining the appropriate portion of the cycle trace within the boundaries of the open rectangle of the indicator needle; and
7. precise and reproducible movement of the projected cycle trace on the viewing screen is obtained with the driving schedule on a film since the film is not subject to dimensional changes due to temperature and humidity and the much stronger sprocket holes have greater resistance to deformation and tearing.

After a few trial runs, it has been found that an average driver has no difficulty in keeping the speed tolerance at ± 0.25 m.p.h. and the time tolerance at ± 0.5 second.

The embodiments of the invention in which an exclusive property or privilege is claimed are defined as follows:

1. Apparatus for use by the driver of a motor vehicle which is operatively connected to a dynamometer, in which use the driver adheres to a prescribed driving schedule by controlling and maintaining the speed of the motor vehicle, which apparatus comprises
   a. means for projecting upon a viewing screen a constantly and precisely advancing driving cycle trace which is a graphical time vs. speed recordation of the prescribed driving cycle, and
   b. indicator means for following the advancing driving cycle trace, which indicator means is operatively connected to the dynamometer, is responsive to the motor vehicle speed and moves across the viewing screen in a direction which is perpendicular to the direction of advancement of the driving cycle trace.

2. Apparatus for use by the driver of a motor vehicle which is operatively connected to a dynamometer, in which use the driver adheres to a prescribed driving schedule by controlling and maintaining the speed of the motor vehicle, which apparatus comprises
   a. a self-contained projector containing a viewing screen and an optical projection means comprising a lamp, a collimator lens system, a film gate, a diverging lens system and a pair of mirrors, the collimator lens system disposed between the lamp and the film gate for directing the light onto the film gate and the diverging lens system disposed between the film gate and the mirrors, the mirrors so arranged that the light emerging from the diverging lens system falls upon the first mirror and is reflected to the second mirror, the second mirror then reflecting the light to strike the viewing screen and thereby projecting an image on the viewing screen when a film is in position in the film gate,
   b. a strip film advancing means to constantly and precisely advance a film through the film gate, the film having recorded thereon a time vs. speed graph of the prescribed driving cycle, the film being advanced through the film gate in a direction such that its projected image on the viewing screen moves in a specified direction,
   c. an indicator means which is positioned so that it covers a portion of the viewing screen, and
   d. a servo unit responsively attached to the indicator means so that the movement of the indicator means is in a direction which is perpendicular to the direction of advancement of the projected image, the servo unit comprising a servo motor and a servo amplifier and being capable of receiving an electrical signal from the dynamometer, which signal is proportional to the motor vehicle speed.

* * * * *